United States Patent
Zhou et al.

(10) Patent No.: US 10,410,657 B1
(45) Date of Patent: Sep. 10, 2019

(54) DATA STORAGE DEVICE EMPLOYING NOMINAL AND ADAPTIVE MULTI-ACTUATOR DECOUPLER

(71) Applicant: Western Digital Technologies, Inc., San Jose, CA (US)

(72) Inventors: Jianguo Zhou, Foothill Ranch, CA (US); Masahito Kobayashi, Ibaraki (JP); Tetsuo Semba, Zama (JP); Feng Hong, San Jose, CA (US); Hidehiko Numasato, Kanagawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/252,593

(22) Filed: Jan. 19, 2019

(51) Int. Cl.
| | | |
|---|---|---|
| *G11B 5/54* | (2006.01) | |
| *G11B 5/012* | (2006.01) | |
| *G11B 21/10* | (2006.01) | |

(52) U.S. Cl.
CPC .............. *G11B 5/012* (2013.01); *G11B 21/10* (2013.01)

(58) Field of Classification Search
CPC ..... G11B 5/09; G11B 20/10; G11B 20/10046; G11B 5/02; G11B 20/10027; G11B 15/52; G11B 5/59633; G11B 5/556; G11B 5/54
USPC ....... 360/39, 65, 67, 75, 73.12, 77.06, 78.05
See application file for complete search history.

(56) References Cited

U.S. PATENT DOCUMENTS

| | | | |
|---|---|---|---|
| 6,490,138 B1 | 12/2002 | Prater | |
| 6,493,172 B1 | 12/2002 | Morris et al. | |
| 6,563,657 B1 | 5/2003 | Serrano et al. | |
| 6,687,092 B2 | 2/2004 | Kan et al. | |
| 6,747,836 B2 | 6/2004 | Stevens et al. | |
| 6,765,743 B2 | 7/2004 | Goodman et al. | |
| 6,952,322 B1 | 10/2005 | Codilian et al. | |
| 7,245,448 B2 | 7/2007 | Urata | |
| 7,277,258 B2 | 10/2007 | Hirano et al. | |
| 7,486,470 B1 | 2/2009 | Semba | |
| 8,743,503 B1 | 6/2014 | Tang et al. | |
| 8,896,955 B1 | 11/2014 | Chen et al. | |
| 9,058,827 B1 | 6/2015 | Tu et al. | |
| 9,147,419 B2 | 9/2015 | Oberg et al. | |
| 9,361,919 B1 | 6/2016 | Lieu et al. | |

(Continued)

FOREIGN PATENT DOCUMENTS

WO 2016053195 A1 7/2016

OTHER PUBLICATIONS

D. Chunling, G. Guo, J. Zhang, "Interaction Rejection of Multiple Microactuators in Dual-Stage Servos for Hard Disk Drives" IEEE Transactions on Control Systems Technology, vol. 14, No. 3, May 2006.

*Primary Examiner* — Nabil Z Hindi

(57) ABSTRACT

A data storage device is disclosed comprising a first actuator configured to actuate a first head over a first disk surface, and a second actuator configured to actuate a second head over a second disk surface. A seeking control signal is generated and used to control the first actuator to seek the first head over the first disk surface. The seeking control signal is filtered with a decoupler to generate a decoupler control signal, wherein the decoupler comprises a nominal decoupler and an adaptive decoupler. A tracking control signal is generated based on the decoupler control signal, and the tracking control signal is used to control the second actuator in order to access the second disk surface using the second head.

11 Claims, 6 Drawing Sheets

(56) References Cited

U.S. PATENT DOCUMENTS

| | | |
|---|---|---|
| 9,792,938 B1 | 10/2017 | Kobayashi et al. |
| 9,911,442 B1 | 3/2018 | Kharisov et al. |
| 9,934,803 B1 | 4/2018 | Semba et al. |
| 2004/0004781 A1 | 1/2004 | Kobayashi et al. |
| 2007/0183076 A1 | 8/2007 | Baugh et al. |
| 2012/0327756 A1* | 12/2012 | Sekiguchi ............ G11B 7/1374 369/112.25 |

* cited by examiner

DATA STORAGE DEVICE EMPLOYING NOMINAL AND ADAPTIVE MULTI-ACTUATOR DECOUPLER

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
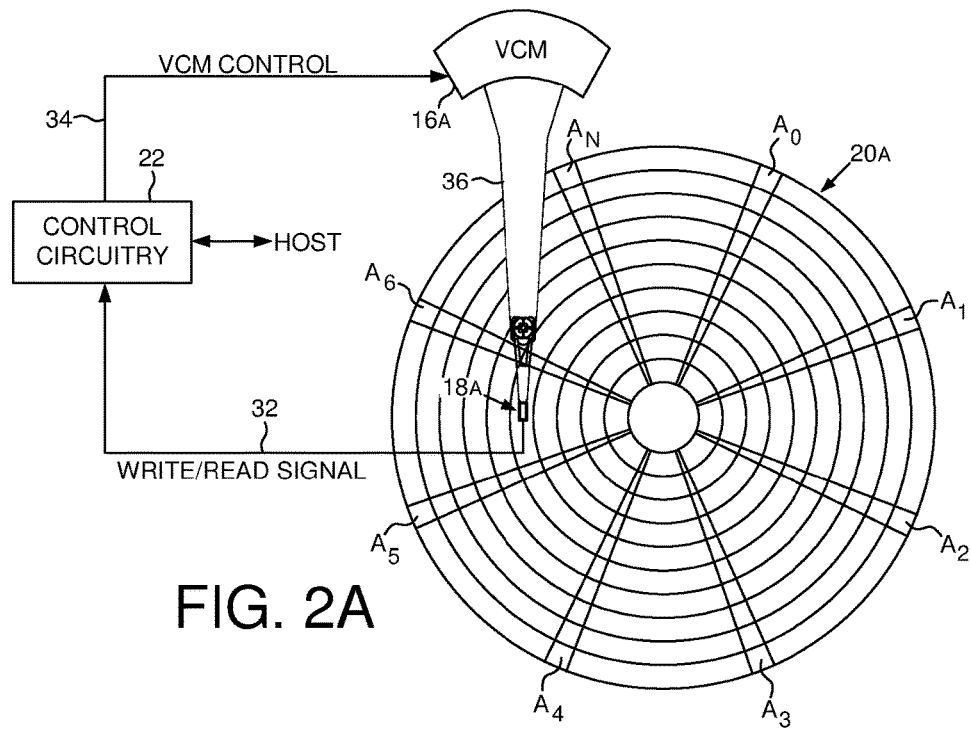
FIGS. 2A-2B show a data storage device in the form of a disk drive according to an embodiment comprising a first and second actuator configured to actuate respective heads over respective disk surfaces.
Figure 2B:
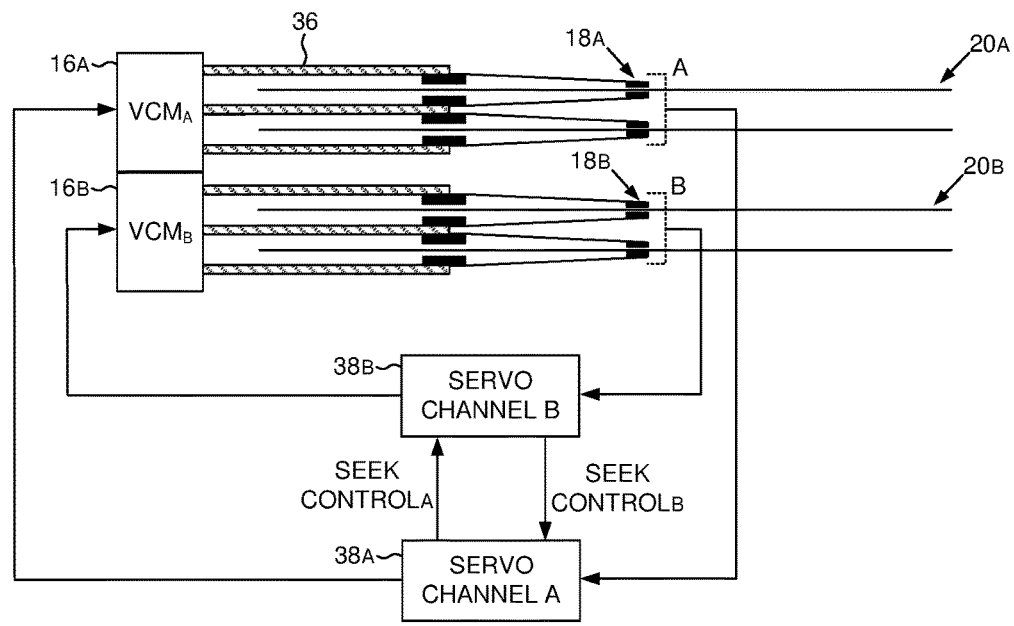
Figure 2C:
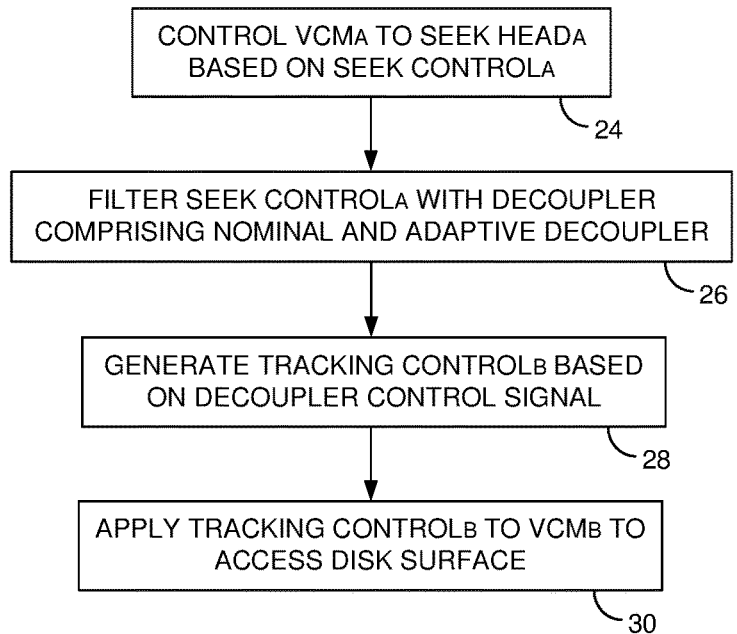
FIG. 2C is a flow diagram according to an embodiment wherein when seeking the first actuator a coupling disturbance affecting the second actuator is attenuated using a decoupler comprising a nominal and adaptive decoupler.

FIGS. 2A and 2B show a data storage device in the form of a disk drive according to an embodiment comprising a first actuator $16_A$ configured to actuate a first head $18_A$ over a first disk surface $20_A$, and a second actuator $16_B$ configured to actuate a second head $18_B$ over a second disk surface $20_B$. The disk drive further comprises control circuitry 22 configured to execute the flow diagram of FIG. 2C, wherein a seeking control signal is generated and used to control the first actuator $16_A$ to seek the first head over the first disk surface (block 24). The seeking control signal is filtered with a decoupler to generate a decoupler control signal (block 26), wherein the decoupler comprises a nominal decoupler and an adaptive decoupler. A tracking control signal is generated based on the decoupler control signal (block 28), wherein the tracking control signal is used to control the second actuator in order to access the second disk surface using the second head (block 30).

Figure 1:
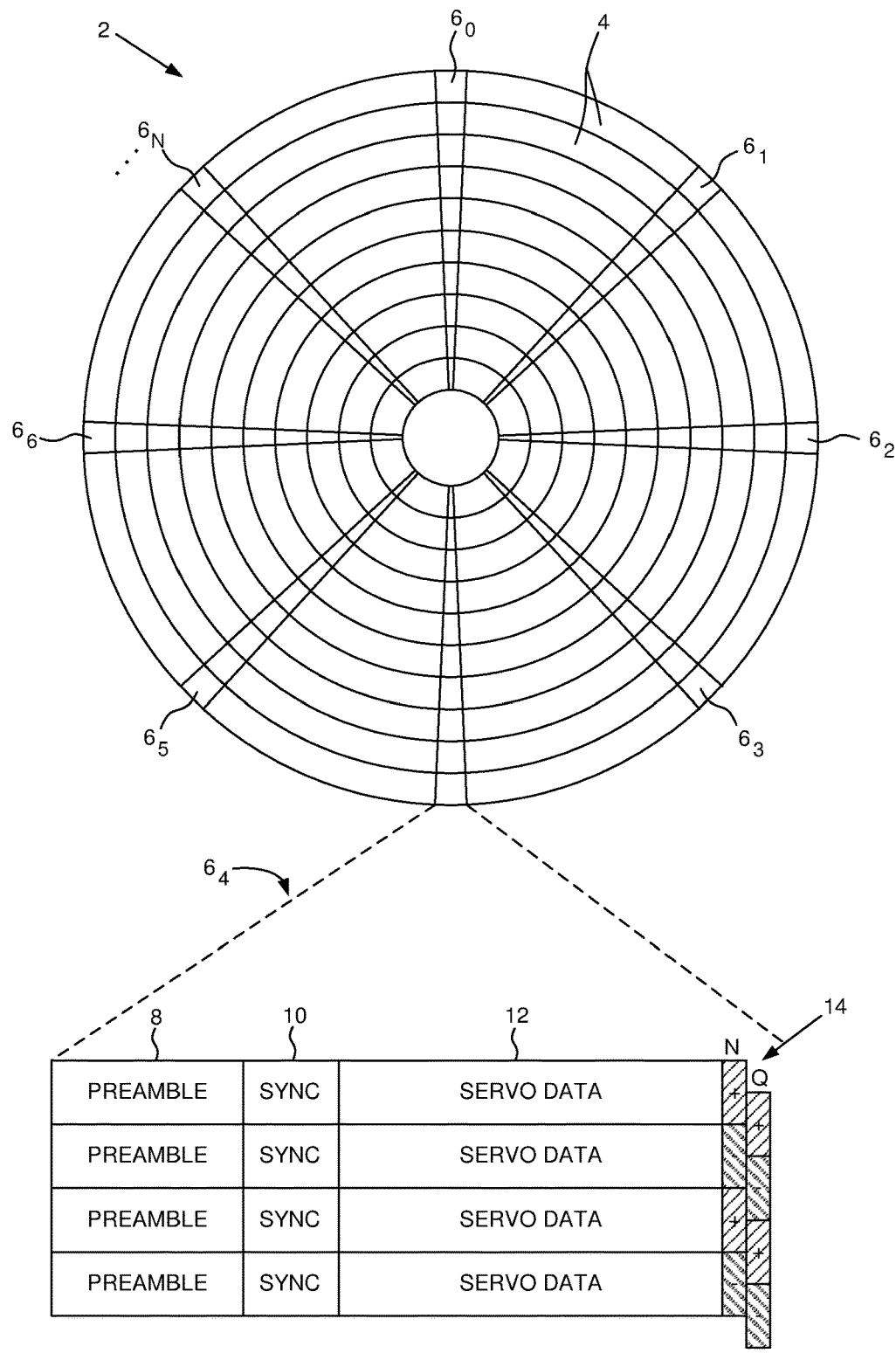
FIG. 1 shows a prior art disk format comprising a plurality of servo tracks defined by servo sectors.

In the embodiment of FIG. 2A, each disk surface comprises a plurality of servo sectors $A_0$-$A_N$ that define a plurality of servo tracks, wherein data tracks are defined relative to the servo tracks at the same or different radial density. The control circuitry 22 processes a read signal 32 emanating from the respective head to demodulate the servo sectors and generate a position error signal (PES) representing an error between the actual position of the head and a target position relative to a target track. A servo control system in the control circuitry 22 filters the PES using a suitable compensation filter to generate a control signal 34 applied to a voice coil motor (VCM) $16_A$ which rotates an actuator arm 36 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1).

Any suitable actuators may be employed to actuate the heads over the respective disk surfaces. In the embodiment of FIG. 2B, the first actuator $16_A$ comprises a first $VCM_A$ and the second actuator $16_B$ comprises a second $VCM_B$ which rotate respective actuator arms about a common shaft. In the example of FIG. 2B, each VCM rotates three actuator arms about the common pivot so as to actuate eight heads over respective disk surfaces (four for each actuator). However, other embodiments may employ any suitable number of VCMs which may rotate any suitable number of actuator arms about the common pivot. Also in the embodiment of FIG. 2B, a first servo channel $38_A$ controls the first actuator $16_A$ and a second servo channel $32_B$ controls the second actuator $16_B$, wherein the servo channels may be implemented in separate integrated circuits, or in the same integrated circuit. In other embodiments described below, one or both of the actuators $16_A$ and $16_B$ may comprise any suitable secondary actuator, such as a secondary actuator configured to actuate a suspension relative to the actuator arm 36, or a secondary actuator configured to actuate the head 16 relative to the suspension.

In one embodiment, it may be desirable to control the multiple actuators (e.g., multiple VCMs) using a multiple input multiple output (MIMO) control system. For example, in one embodiment it may be desirable to attenuate a coupling disturbance from the second actuator $16_B$ when seeking the second actuator $16_B$ while concurrently tracking a data track on the first disk surface $20_A$ using the first actuator $16_A$. In order to attenuate this coupling disturbance, in one embodiment a seek control signal from the second servo channel $38_B$ may be transmitted to the first servo channel $38_A$ and used to generate the control signal applied to the first actuator $16_A$. There may be a similar cross-channel transfer of servo information when tracking a servo track on the second disk surface $20_B$ in order to attenuate a coupling disturbance from the first actuator $16_A$. Any suitable seek control signal may be transmitted between the servo channels, such as the PES generated by the servo channel, a command value for generating the control signal applied to the respective actuators, state information generated by a state estimator, a seek profile used to seek a respective head to a target track, coarse component of the PES, fine component of the PES, status of the servo channel (seeking, reading, writing, write inhibit, etc.), active head number, or radial location of the head (e.g., inner, middle, or outer diameter). In one embodiment, the servo information transmitted between servo channels may relate to the control of a secondary actuator, such as a command value used to generate the control signal applied to the secondary actuator.

Figure 3:
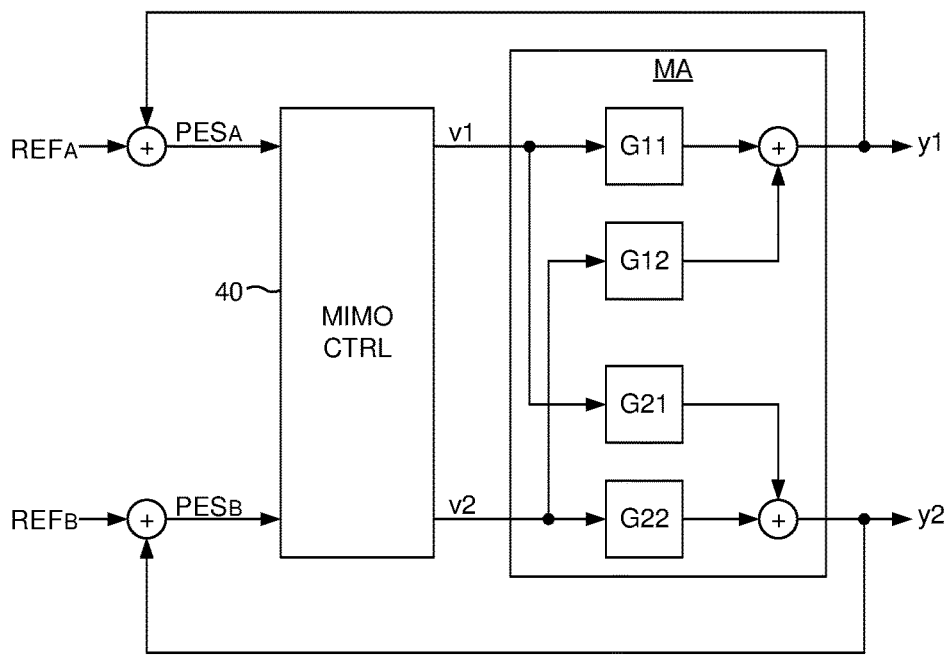
FIG. 3 shows control circuitry according to an embodiment comprising a multiple input multiple output (MIMO) control system configured to compensate for the coupling disturbance across the multiple actuators.

FIG. 3 shows an example embodiment wherein the first and second servo channels are represented generally by a multiple input multiple output (MIMO) control system 40 configured to compensate for the coupling disturbance across the multiple actuators. Each servo channel generates a control signal v1 and v2 representing the output of respective DACs, wherein command value v1 is applied to a first actuator (e.g., $VCM_A$) represented by transfer function G11 and command value v2 is applied to a second actuator (e.g., $VCM_B$) represented by transfer function G22. The coupling disturbance from the second actuator which affects the first actuator is represented by transfer function G12, and the coupling disturbance from the first actuator which affects the second actuator is represented by transfer function G21. The multiple actuators are collectively represented by transfer function MA having a first position signal output y1 representing a position of a first head $18_A$ and a second position output signal y2 representing a position of a second head $18_B$. The position output signals are subtracted from respective reference signals $REF_A$ and $REF_B$ to generate respective position error signals $PES_A$ and $PES_B$ representing the multiple inputs of the MIMO control system 40.

Figure 4A:
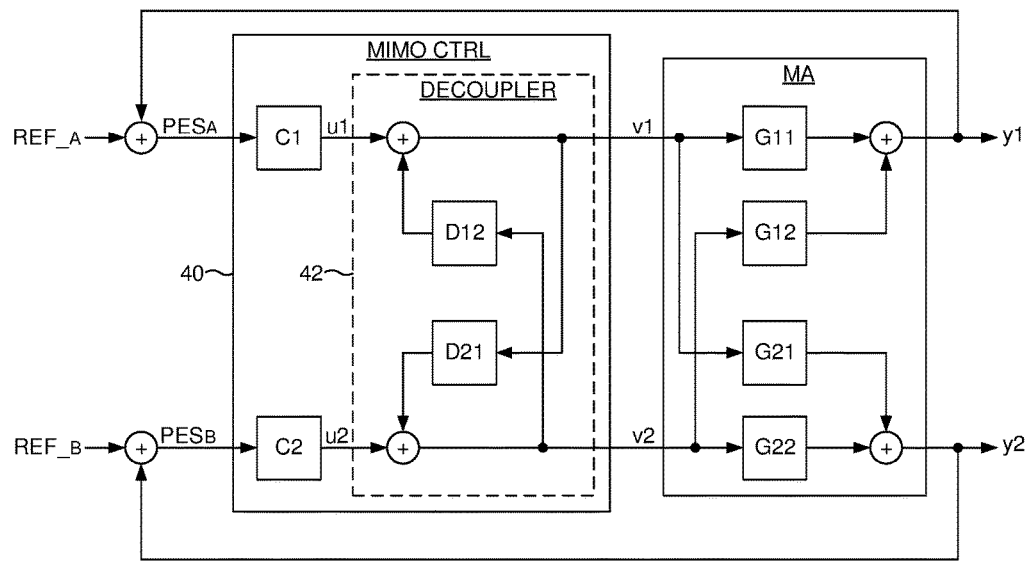
FIG. 4A shows an embodiment wherein the MIMO control system comprising a servo compensator and a nominal decoupler for adjusting the output of the servo compensator in order to attenuate the coupling disturbance.

The MIMO control system 40 of FIG. 3 may be implemented in any suitable manner to compensate for the coupling disturbances across the multiple actuators. FIG. 4A shows an embodiment of a MIMO control system 40 comprising a first servo compensator C1 configured to filter the $PES_A$ to generate a control signal u1, and a second servo compensator C2 configured to filter the $PES_B$ to generate a control signal u2. A decoupler block 42 adjusts the control signal u1 using a first nominal decoupler D12 in order to attenuate a coupling disturbance G12 affecting the first actuator G11 and induced by seeking the second actuator G22, and adjusts the control signal u2 using a second nominal decoupler D21 to attenuate a coupling disturbance G21 affecting the second actuator G22 and induced by seeking the first actuator G11. In this manner, in one embodiment the respective servo compensators C1 and C2 may be designed independent of the coupling disturbance affecting the respective actuators. That is, in one embodiment the compensated control signals v1 and v2 are effectively generated by the respective servo compensators C1 and C2 as if there were no coupling disturbance affecting the servo loops.

Figure 4B:
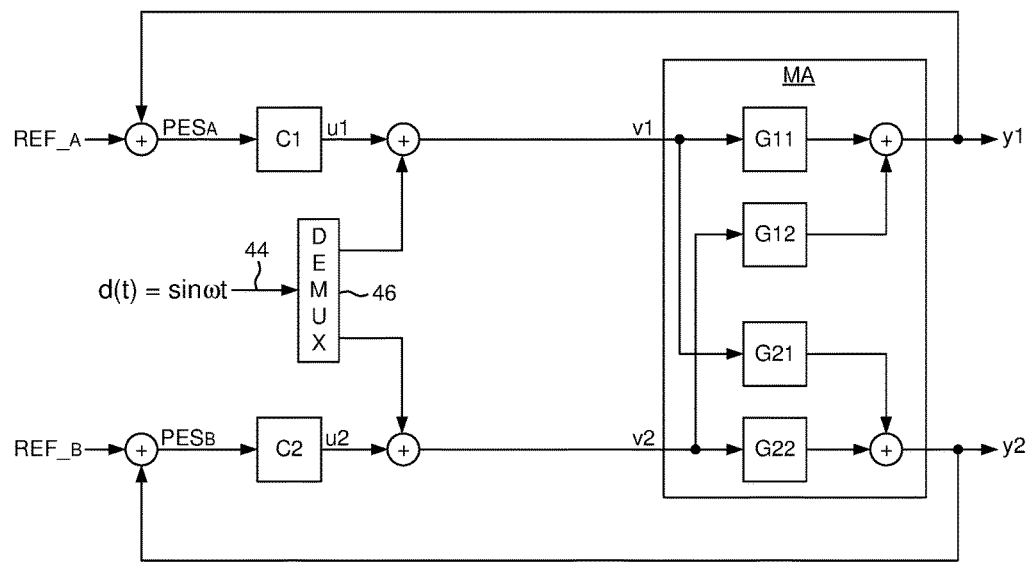
FIG. 4B shows control circuitry according to an embodiment wherein a disturbance signal is injected into the servo loop of one of the actuators in order to measure the coupling disturbance affecting another actuator, thereby enabling the configuration of a corresponding nominal decoupler.

The nominal decouplers D12 and D21 in the decoupler block 42 of FIG. 4A may be generated in any suitable manner. In one embodiment, the coupling disturbances G12 and G21 may be measured, and the respective nominal decouplers D12 and D21 generated as a function of the measured coupling disturbances G12 and G21. The coupling disturbances G12 and G21 may be measured in any suitable manner, wherein in an embodiment shown in FIG. 4B, each coupling disturbance may be generated by injecting a sinusoidal disturbance 44 into one of the servo loops and measuring the effect of the sinusoidal disturbance 44 on the other servo loop. For example when measuring the coupling disturbance G21 in FIG. 4B, a multiplexer 46 is configured to add the sinusoidal disturbance 44 to the control signal u1, wherein the resulting control signal v1 is applied to the first actuator G11. The transfer function representing the coupling disturbance G21 may then be represented as:

$$G21 = -\frac{PES_B/S_2/S_1}{d}$$

where d represents the sinusoidal disturbance, $S_1$ represents a sensitivity function of the first servo loop (corresponding to actuator G11), and $S_2$ represents a sensitivity function of the second servo loop (corresponding to actuator G22). In one embodiment, the coupling disturbance G21 may be measured at multiple frequencies of the sinusoidal disturbance 44 in order to measure the transfer function across the frequency band of interest (e.g., a known frequency band corresponding to the cross-channel coupling disturbance of nominal actuators). In an embodiment described below wherein each actuator comprises a primary actuator (e.g., a VCM) and a secondary actuator (e.g., a piezoelectric (PZT) actuator), the coupling disturbance G21 may be represented as:

$$G21 = -\frac{PES_B/S_2/S_{v1}}{d}$$

where $S_{v1}$ represents the sensitivity function of first servo loop without the secondary actuator (since the sinusoidal disturbance 44 affects only the VCM), and $S_2$ represents the sensitivity function of the second servo loop including the secondary actuator (since the coupling disturbance G21 affects both actuators).

Referring again to FIG. 4A, after estimating or measuring the coupling disturbances G12 and G21 such as described above, the nominal decouplers D12 and D21 may be generated in one embodiment based on:

$$y1 = G11 \cdot v1 + G12 \cdot v2$$

$$y2 = G21 \cdot v1 + G22 \cdot v2$$

$$v1 = u1 + D12 \cdot v2$$

$$v2 = u2 + D21v1$$

$$\begin{bmatrix} y1 \\ y2 \end{bmatrix} = \begin{bmatrix} G11 & G12 \\ G21 & G22 \end{bmatrix} \begin{bmatrix} v1 \\ v2 \end{bmatrix} =$$

$$\frac{1}{1 - D12 \cdot D21} \begin{bmatrix} G11 & G12 \\ G21 & G22 \end{bmatrix} \begin{bmatrix} 1 & D12 \\ D21 & 1 \end{bmatrix} \begin{bmatrix} u1 \\ u2 \end{bmatrix}$$

Achieving a decoupled system means:

$$\begin{bmatrix} y1 \\ y2 \end{bmatrix} = \begin{bmatrix} G11 & 0 \\ 0 & G22 \end{bmatrix} \begin{bmatrix} u1 \\ u2 \end{bmatrix}$$

From the above equations, the decouplers in FIG. 4A may therefore be generated as:

$$D12 = -\frac{G12}{G11}; D21 = -\frac{G21}{G22}$$

Figure 5A:
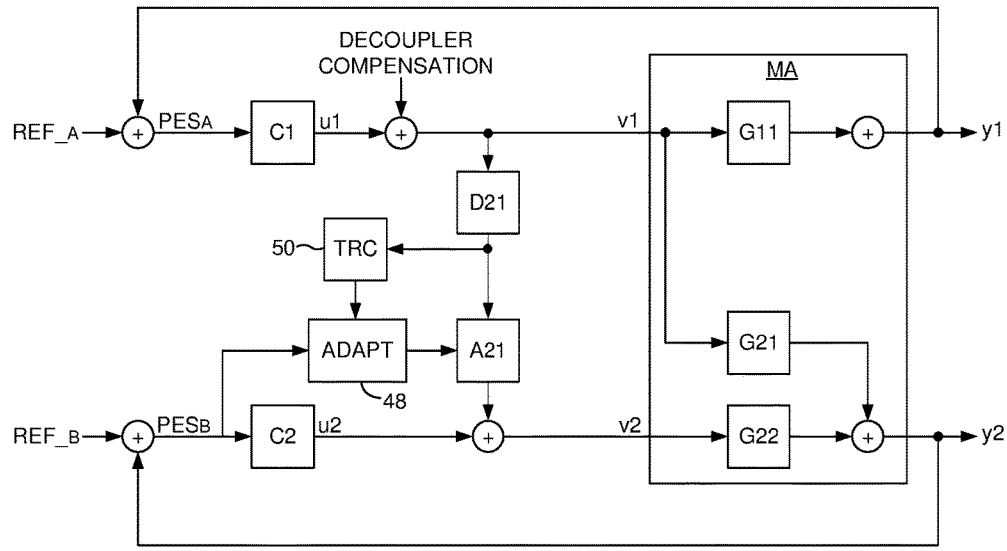
FIG. 5A shows control circuitry according to an embodiment wherein the output of the nominal decoupler is processed by an adaptive decoupler that attenuates a residual coupling disturbance that may remain after processing with the nominal decoupler.

In on embodiment, the nominal decouplers D12 and D21 in the MIMO control system of FIG. 4A may not fully attenuate the coupling disturbance across the servo channels, for example, there may be a residual coupling disturbance due to variations in the servo channel components that may occur over time, such as general degradation or changes in environmental conditions (e.g., ambient temperature). Accordingly in one embodiment, the nominal decouplers D12 and D21 in the MIMO control system may be augmented using an adaptive decoupler configured to attenuate a residual coupling disturbance. FIG. 5A shows an embodiment of a decoupler system for the second servo channel comprising a nominal decoupler D21 and an adaptive decoupler A21. In this embodiment, the control signal v1 used to control the actuator G11 of the first servo channel is filtered by the nominal decoupler D21, and the output of the nominal decoupler D21 is filtered by the adaptive decoupler A21. The output of the adaptive decoupler A21 is then used to adjust the control signal u2 to generate the compensated control signal v2 used to control the second actuator G22. In the embodiment of FIG. 5A, the adaptive decoupler A21 is adapted at block 48 based on the $PES_B$ and the output of the nominal decoupler D21 after being filtered by a torque rejection curve TRC 50 of the second servo channel. Block 48 may implement any suitable adaptation algorithm in order to adapt the coefficients of the adaptive decoupler A21. For example, in one embodiment bock 48 may implement a Filtered-X least mean square (LMS) algorithm, or a Filtered-X normalized least mean square (NLMS) algorithm. Other known algorithms for adapting coefficients of a filter include a time varying least means square (TVLMS) algorithm, a recursive least square (RLS) algorithm, a faster transversal recursive least square (FTRLS) algorithm, etc.

In one embodiment, the adaptation algorithm implemented at block 48 of FIG. 5A may converge faster and/or the number of programmable coefficients in the adaptive decoupler A21 may be reduced due to compensating for a residual coupling disturbance as compared to compensating for the entire coupling disturbance (i.e., if the decoupler system did not include a nominal decoupler D21 compensating for a significant part of the coupling disturbance).

Figure 5B:
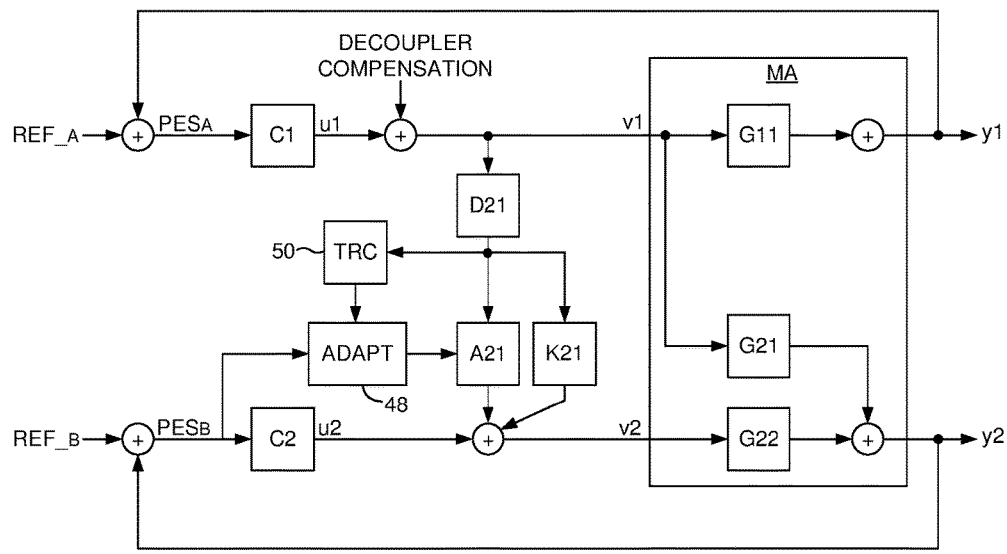
FIG. 5B shows control circuitry according to an embodiment wherein an output of the adaptive decoupler is added to an output of the nominal decoupler in order to generate the compensation value for adjusting the output of the servo compensator.

In an alternative embodiment of the decoupler system for the second servo channel the output of the nominal decoupler D21 may be combined with the output of the adaptive decoupler A21 and the result used to adjust the control signal u2 in order to generate the compensated control signal v2 used to control the second actuator G22. For example in an embodiment shown in FIG. 5B, the output of the nominal decoupler D21 may be amplified by a gain K21, wherein the resulting amplified nominal decoupler signal is added to the output of the adaptive decoupler A21 to generate the compensated control signal v2. In one embodiment, for each head the gain K21 may be calibrated and/or adapted, for example, by adjusting the gain K21 toward a value that minimizes the residual coupling disturbance affecting the second head while seeking the first head. In both embodiments shown in FIGS. 5A and 5B, the coefficients of the adaptive decoupler A21 will adapt so to compensate for any residual coupling disturbance not compensated by the nominal decoupler D21.

Figure 6:
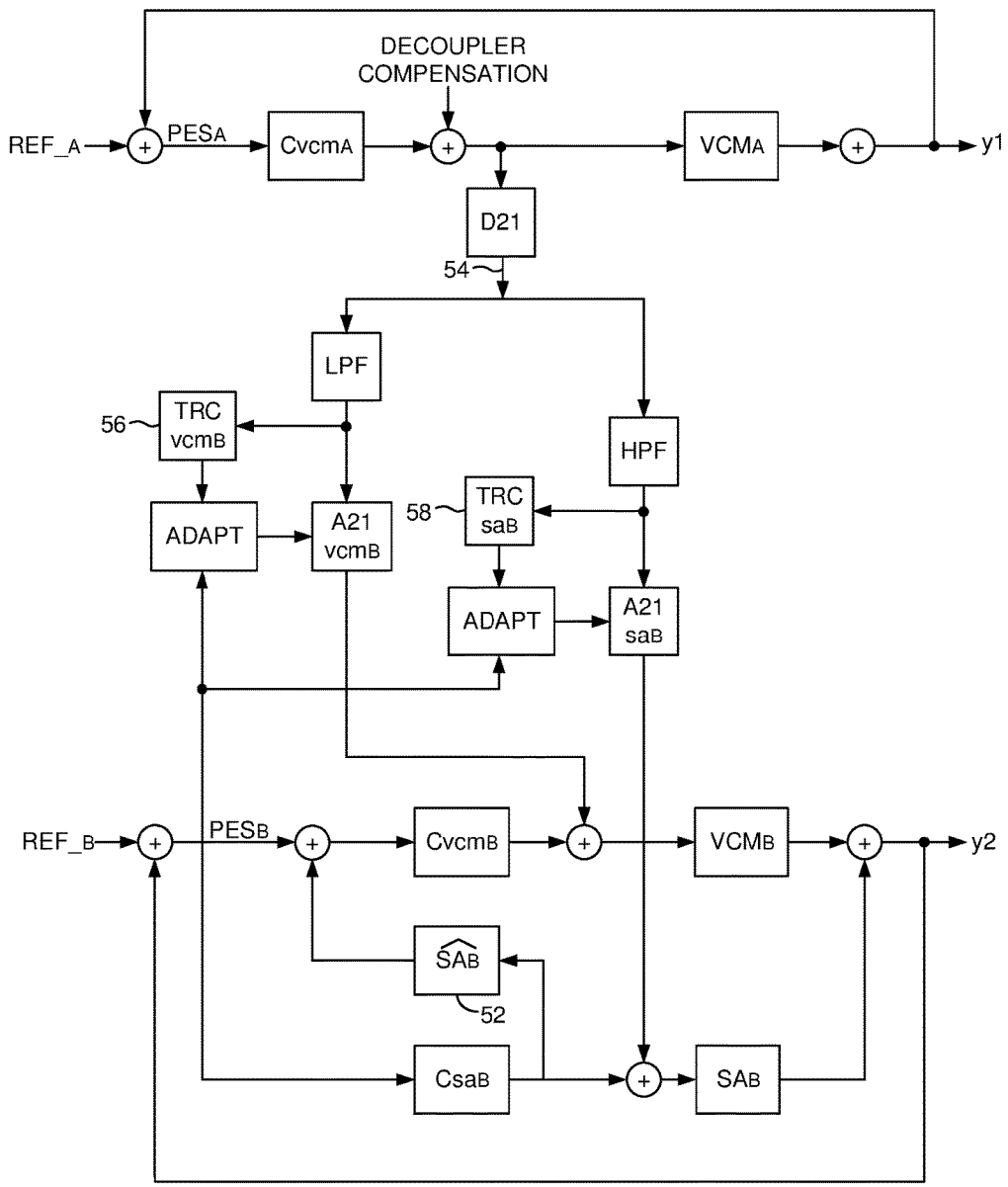
FIG. 6 shows an embodiment wherein an actuator for actuating a respective head may comprise a voice coil motor (VCM) and a secondary actuator, wherein the decoupler may generate compensation values for the VCM and secondary actuator using respective adaptive decouplers.

FIG. 6 shows an embodiment wherein each actuator for actuating a respective head comprises a primary actuator (a VCM) and a secondary actuator (SA), such as a PZT. An embodiment of the servo loop for the second servo channel B is shown in FIG. 6 as comprising a VCM servo compensator (CvcmB) and a $SA_B$ compensator (CsaB). The second servo channel A further comprises a model 52 of the $SA_B$ which generates an estimated response of the $SA_B$ that is subtracted from the $PES_B$ in order to cancel the effect of the $SA_B$ on the $VCM_B$ servo loop. In this embodiment, the coupling disturbance due to seeking a head using the first servo channel A may affect both the $VCM_B$ servo loop and the $SA_B$ servo loop of the second servo channel B. Accordingly in the embodiment of FIG. 6 the nominal decoupler D21 is designed as described above based on the actuator of the second servo channel B comprising a VCM and a secondary actuator. The output 54 of the nominal decoupler D21 is filtered by a low pass filter (LPF), the output of which is processed by a first adaptive decoupler A21_vcmB to generate the compensation value for adjusting the output of the CvcmB. The output 54 of the nominal decoupler D21 is also filtered by a high pas filter (HPF), the output of which is processed by a second adaptive decoupler A21_saB to generate the compensation value for adjusting the output of the CsaB. In this embodiment, the TRC 56 corresponds to the TRC for the $VCM_B$ servo loop, and the TRC 58 corresponds to the TRC for the $SA_B$ servo loop. In one embodiment, the output of the nominal decoupler D21 shown in FIG. 6 may be added to the output of the adaptive decouplers similar to the embodiment shown in FIG. 5B. Although FIG. 6 shows the full servo loop and decoupler for the second servo channel B, in one embodiment the first servo channel A also comprises a similar VCM/SA servo loop and decoupler.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a first actuator configured to actuate a first head over a first disk surface;
    a second actuator configured to actuate a second head over a second disk surface; and
    control circuitry configured to:
        generate a seeking control signal used to control the first actuator to seek the first head over the first disk surface;
        filter the seeking control signal with a decoupler to generate a decoupler control signal, wherein the decoupler comprises a nominal decoupler and an adaptive decoupler;
        generate a tracking control signal based on the decoupler control signal; and
        use the tracking control signal to control the second actuator in order to access the second disk surface using the second head.

2. The data storage device as recited in claim 1, wherein the control circuitry is further configured to:
    filter the seeking control signal with the nominal decoupler to generate a nominal decoupler control signal; and
    filter the nominal decoupler control signal with the adaptive decoupler to generate the tracking control signal.

3. The data storage device as recited in claim 2, wherein the control circuitry is further configured to combine the nominal decoupler control signal with an output of the adaptive decoupler to generate the tracking control signal.

4. The data storage device as recited in claim 1, wherein the second actuator comprises a voice coil motor (VCM) and a secondary actuator, the adaptive decoupler comprises a first adaptive decoupler and a second adaptive decoupler, and the control circuitry is further configured to:
    filter the seeking control signal with the nominal decoupler to generate a nominal decoupler control signal;
    filter the nominal decoupler control signal with a low pass filter to generate a low pass signal;
    filter the low pass signal with the first adaptive decoupler to generate a first tracking control signal applied to the VCM;
    filter the nominal decoupler control signal with a high pass filter to generate a high pass signal; and
    filter the high pass signal with the second adaptive decoupler to generate a second tracking control signal applied to the secondary actuator.

5. The data storage device as recited in claim 1, wherein and the control circuitry is further configured to calibrate the nominal decoupler by:
    generating a disturbance signal applied to the first actuator; and
    measuring a response of the second actuator to the disturbance signal.

6. The data storage device as recited in claim 5, wherein the disturbance signal consists of a sinusoidal signal and the control circuitry is configured to calibrate the nominal decoupler by measuring the response of the second actuator at multiple frequencies of the sinusoidal signal.

7. A method of operating a data storage device, the method comprising:
    generating a seeking control signal used to control a first actuator to seek a first head over a first disk surface;
    filtering the seeking control signal with a nominal decoupler to generate a nominal decoupler control signal;
    filtering the nominal decoupler control signal with a low pass filter to generate a low pass signal;
    processing the low pass signal to generate a first tracking control signal applied to a voice coil motor (VCM) configured to actuate a second head over a second disk surface;
    filtering the nominal decoupler control signal with a high pass filter to generate a high pass signal; and processing the high pass signal to generate a second tracking control signal applied to a secondary actuator configured to actuate the second head over the second disk surface.

8. The method as recited in claim 7, wherein:

processing the low pass signal comprises filtering the low pass signal with a first adaptive decoupler to generate the first tracking control signal applied to the VCM; and processing the high pass signal comprises filtering the high pass signal with a second adaptive decoupler to generate a second tracking control signal applied to the secondary actuator.

9. The method as recited in claim 8, further comprising:

combining the nominal decoupler control signal with an output of the first adaptive decoupler to generate the first tracking control signal; and combining the nominal decoupler control signal with an output of the second adaptive decoupler to generate the second tracking control signal.

10. The method as recited in claim 7, further comprising calibrating the nominal decoupler by:

generating a disturbance signal applied to the first actuator; and measuring a response of the second head to the disturbance signal.

11. The method as recited in claim 10, wherein the disturbance signal consists of a sinusoidal signal and the method further comprises calibrating the nominal decoupler by measuring the response of the second head at multiple frequencies of the sinusoidal signal.

* * * * *